United States Patent
Haskin et al.

(10) Patent No.: US 9,367,786 B2
(45) Date of Patent: Jun. 14, 2016

(54) RADIO WITH EMBEDDED RFID

(71) Applicant: MOTOROLA SOLUTIONS, INC, Schaumburg, IL (US)

(72) Inventors: Igor Haskin, Glenview, IL (US); Pedram Djavadkhani, Georgetown (MY); Mark A Keck, Elgin, IL (US); Chi Meng Khong, Bayan Lepas (MY); Dale J Rublaitus, Hoffman Estates, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 139 days.

(21) Appl. No.: 14/090,680

(22) Filed: Nov. 26, 2013

(65) Prior Publication Data

US 2015/0145679 A1   May 28, 2015

(51) Int. Cl.
*G08B 13/14* (2006.01)
*G06K 19/07* (2006.01)
*G06Q 10/08* (2012.01)
*H04M 1/02* (2006.01)
*B60R 1/00* (2006.01)
*G01S 1/00* (2006.01)

(52) U.S. Cl.
CPC .......... *G06K 19/0723* (2013.01); *G06Q 10/087* (2013.01); *G06Q 10/0875* (2013.01); *H04M 1/0254* (2013.01); *B60R 1/00* (2013.01); *G01S 1/00* (2013.01); *H04M 2250/04* (2013.01); *Y10T 29/4973* (2015.01)

(58) Field of Classification Search
CPC .................................... B60R 1/00; G01S 1/00
See application file for complete search history.

(56) References Cited

U.S. PATENT DOCUMENTS

| | | | |
|---|---|---|---|
| 7,230,539 B2 | 6/2007 | Klein | |
| 7,736,495 B2 | 6/2010 | Ikeyama et al. | |
| 8,444,058 B2 | 5/2013 | Masin | |
| 8,525,677 B2 | 9/2013 | Scharfeld et al. | |
| 2003/0146821 A1 | 8/2003 | Brandt | |
| 2003/0173408 A1* | 9/2003 | Mosher, Jr. ............ | A61B 5/117 235/492 |
| 2005/0262751 A1 | 12/2005 | Leslie | |
| 2007/0232266 A1* | 10/2007 | Pinder .................... | H01Q 1/088 455/411 |
| 2008/0093436 A1 | 4/2008 | Bolhous | |
| 2008/0933436 | 4/2008 | Bolhous | |
| 2008/0177267 A1 | 7/2008 | Sands et al. | |
| 2008/0242375 A1* | 10/2008 | Garcia ................. | H04B 1/3833 455/575.1 |

(Continued)

FOREIGN PATENT DOCUMENTS

| | | |
|---|---|---|
| EP | 1820899 A1 | 8/2007 |
| KR | 10-0615387 B1 | 8/2006 |

(Continued)

OTHER PUBLICATIONS

Extended European Search Report, EP14192093.4, filed: Nov. 6, 2014, mailed: Apr. 1, 2015, all pages.

(Continued)

*Primary Examiner* — Shirley Lu
(74) *Attorney, Agent, or Firm* — Barbara R. Doutre

(57) ABSTRACT

A radio (100) comprises a radio housing (102) having external radio features (104, 106, 108, 110, 112, 114, 116) located on a surface of the radio housing. At least one of the external radio features is removable and replaceable by another external radio feature having a radio frequency identification (RFID) tag (120) embedded therein for retrofitting the radio (100) with RFID capability.

15 Claims, 5 Drawing Sheets

(56) References Cited

U.S. PATENT DOCUMENTS

| | | |
|---|---|---|
| 2010/0102967 A1 | 4/2010 | Lee et al. |
| 2012/0122520 A1 | 5/2012 | Phillips |
| 2012/0187197 A1* | 7/2012 | Masin .............. G06K 19/07758 235/492 |
| 2012/0225630 A1 | 9/2012 | Dunko |
| 2013/0002443 A1* | 1/2013 | Breed ................... G01J 5/0846 340/686.1 |
| 2013/0017814 A1 | 1/2013 | Ali et al. |
| 2013/0196787 A1 | 8/2013 | Luciano et al. |
| 2013/0206844 A1 | 8/2013 | Chen et al. |
| 2014/0125535 A1* | 5/2014 | Ramachandran ...... H01Q 1/243 343/745 |

FOREIGN PATENT DOCUMENTS

| | | |
|---|---|---|
| WO | 9920028 A2 | 4/1999 |
| WO | 2009123922 A2 | 10/2009 |

OTHER PUBLICATIONS

"OMNI-ID FIT 200 RFID TAG—(Pack of 10)," atlasRFIDstore.com, Retrieved from the Internet URL: https://www.atlasrfidstore.com/omni-id-fit-200-rfid-tag-pack-of-10/, on 3/29/2016, Copyright 2016 atlasRFIDstore, pp. 1-3.

* cited by examiner

RADIO WITH EMBEDDED RFID

FIELD OF THE DISCLOSURE

The present disclosure relates generally to communication devices, and more particularly to radios having RFID capability.

BACKGROUND

Radio communication devices, such as handheld two-way radios, vehicular or mobile radios, are often stored in a warehouse or shipped to a distributer or customer in large quantities. Inventory tracking of such devices is thus important. It is desirable that tracking mechanisms not interfere with the overall radio form factor or user interface of the radio. Expeditious tracking without having to open containers and/or handle the actual radio would improve operational efficiency and minimize the likelihood of damage to the radio.

Radio frequency identification (RFID) technology is becoming increasingly important for logistics concerns, material handling and inventory management in retail stores, warehouses, distribution centers, buildings, and like controlled or confined areas. However, the implementation of an RFID tag on a product presents challenges that can involve forming a whole new product line. Products that ship without an RFID tag do not lend themselves well to being retrofitted at a later time.

Accordingly, it would be desirable to combine the benefits of RFID to the portable radio environment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
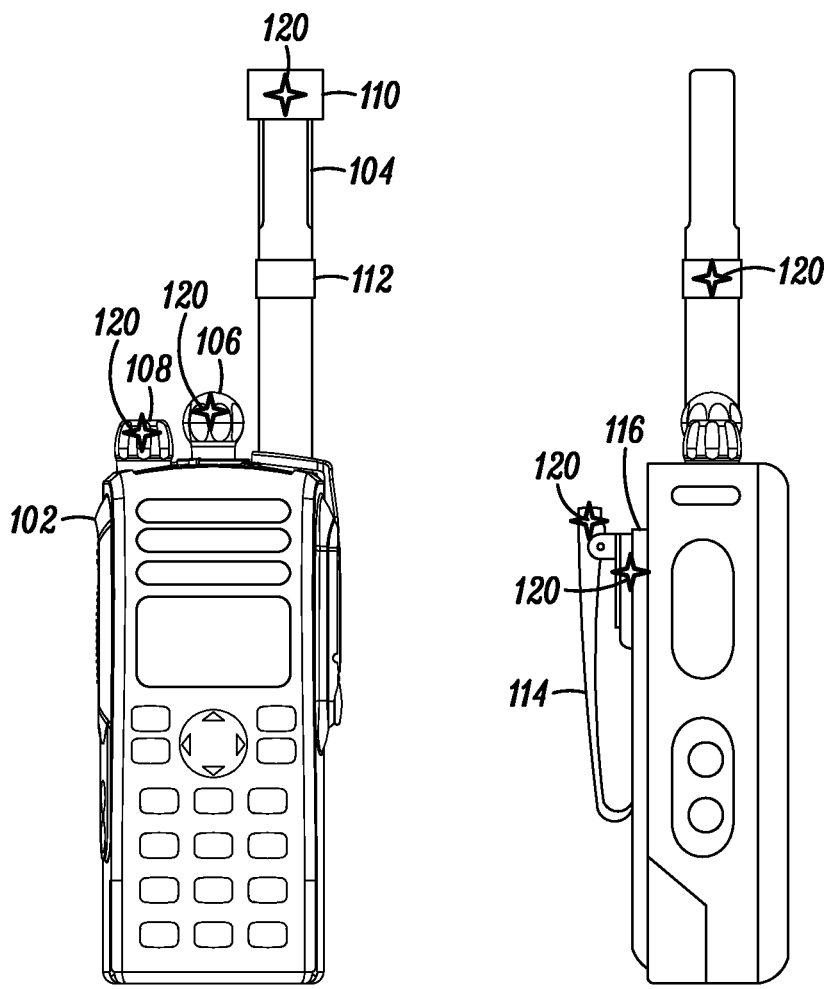
FIG. 1 shows a portable radio incorporating an RFID tag embedded into an external radio feature in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a radio comprising a radio housing having an external radio feature coupled thereto, the external radio feature being removable and replaceable by another external radio feature having a radio frequency identification (RFID) tag embedded therein for retrofitting the radio with RFID capability. The external radio feature may be any radio element which can be removed and replaced at the radio housing. The external radio feature may comprise for example, a removable knob, such as a volume control knob or a channel selector knob, an antenna, an identification band, an external battery pack or a battery cover, or a belt clip.

FIG. 1 is a radio 100, such as a two-way radio, formed in accordance with the various embodiments. Radio 100 comprises a radio housing 102 having an external radio feature located on a surface of the radio housing. In accordance with the various embodiments, the external radio feature(s) are removable and replaceable. The external radio features may comprise a control knob, such as volume control knob 106 or channel control knob 108, an antenna 110, an identification band 112, a battery pack or a battery cover 116, and/or a belt clip 114. In accordance with the various embodiments, the external radio feature has an RFID tag embedded therein. In accordance with the various embodiments, original external radio features (knobs, antennas, clips and the like) without RFID capability can be removed and replaced with external radio features having RFID tags 120 embedded therein, thus retrofitting the handheld radio 100 with RFID capability. A radio or group of radios can also be updated with new RFID tags by simply removing and replacing the old external radio feature(s) with new external radio features having a new RFID tag embedded therein.

FIG. 1 shows various examples for location where the RFID tag 120 may be placed. The RFID tag 120 may be imbedded into the end of the removable antenna 104, or attached as a separate RFID antenna tip to an antenna. Known attachments means can be used. The RFID tag 120 may be also integrated into an identification band. These replaceable bands are typically coupled to an antenna to provide user identification or user group identification. These bands are generally made of a rubber (but may be made of other suitable materials) and come in different colors. The bands can be easily replaced. In accordance with the various embodiments, the RFID tag 120 may be made a part of such a band, to offer yet another way of RFID radio integration. To ensure RFID good performance, RFID tag 120 preferably resides outside of RF blocking elements, such as metal housings, batteries, and the like.

An RFID system typically includes at least one RFID reader, also known as an RFID interrogator, and an RFID tag that is usually attached to, or associated with, an individual item, or to a package for the item. The RFID reader interrogates one or more RFID tags in its coverage range by transmitting a radio frequency (RF) signal, and the RFID tag, which senses the interrogating RF signal, responds by transmitting a return RF signal. The RFID tag either generates the return RF signal originally, or reflects back a portion of the interrogating RF signal in a process known as backscatter. The return RF signal may further encode data stored internally in the tag, such as a number. The return signal is demodulated and decoded by the reader, which thereby identifies, counts, or otherwise interacts with the associated item.

The decoded data can denote a serial number, a price, a date, a destination, other attribute(s), or any combination of attributes, and so on.

Embedding the RFID tag 120 into an external removable external feature of the radio 100 provides a simple and cost effective way to retrofit existing radios with RFID tags while maintaining product's esthetics, usability, and reliability. The RFID tag 120 can also be easily replaced by replacing the external radio feature without having to redesign or reconfigure any components internal to the radio housing 102. When the external radio feature having the RFID tag 120 embedded therein is coupled to the radio 100, the external radio feature provides first and second functions, a first radio function and an RFID tag function. The first radio function may be for example a control knob, antenna, belt clip, band identifier or other removable external radio feature that provides a radio control or user interface.

While shown as a handheld (or portable) radio 100, the radio may also be a vehicular radio or vehicular radio or stationary radio having accessible, removable external radio features. Thus, a vehicular radio used in a public safety environment, such as a police vehicular radio, can be retrofitted with RFID capability by simply changing out a control knob, such as knob 108. This allows for upgrades to take place without having to remove the radio from the car or remove a stationary vehicle from its station.

Figure 2:
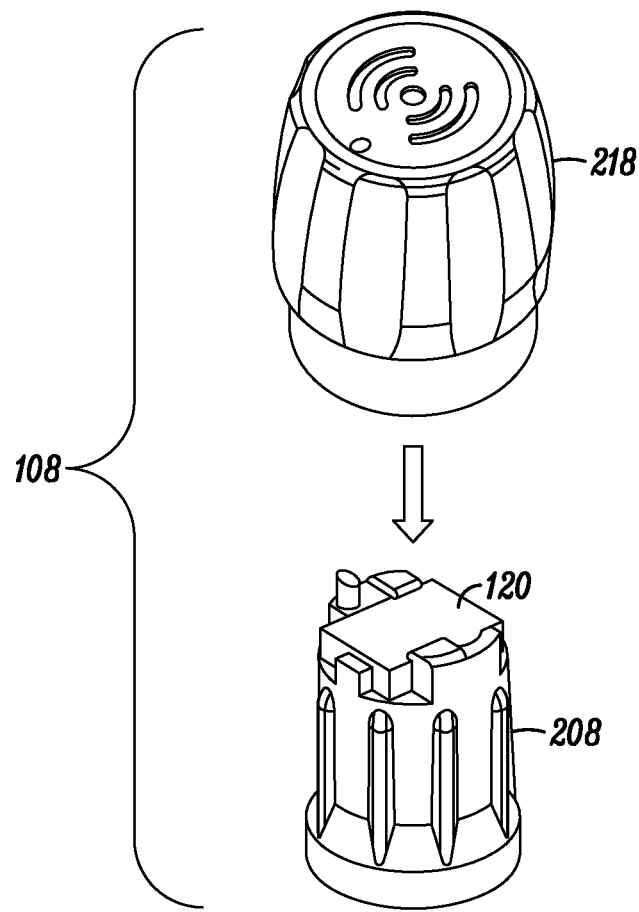
FIG. 2 shows an RFID tag embedded into a control knob for a portable radio in accordance with the various embodiments.

FIG. 2 shows the RFID tag 120 being embedded into the knob 108 for a radio in accordance with embodiments disclosed herein. As seen in FIG. 2, a small RFID tag 120 can be integrated into a removable external element, shown here as knob 108. The RFID tag 120 is encapsulated between a base 208 and a cover 218. The RFID tag 120 is thus hidden within the knob 108 maintaining the radio's esthetics, user interface and functionality. The RFID tag 120 can be encapsulated into the knob 108 by using a variety of techniques, such as overmolding, insert molding, snap fit and or press fit, adhesive, and/or ultrasonic welding assemblies and techniques to name a few. There is no need for any special manufacturing process to encapsulate the RFID tag 120. Knobs, external antenna, belt clip and other external radio features are all good candidates for such an implementation. The removable external radio feature being embedded with an RFID tag 120 allows for an easy retrofit to radio products. For best performance, the RFID tag 120 should not be blocked or shielded and preferably sits high when the radio is packaged in boxes or other containers. Embedding the RFID tag 120 within a control knob (or other external radio feature, protects the tag from physical damage. The radio may be a handheld radio, as shown in FIG. 1, or other radio, such as a vehicular radio or stationary radio.

Figure 3:
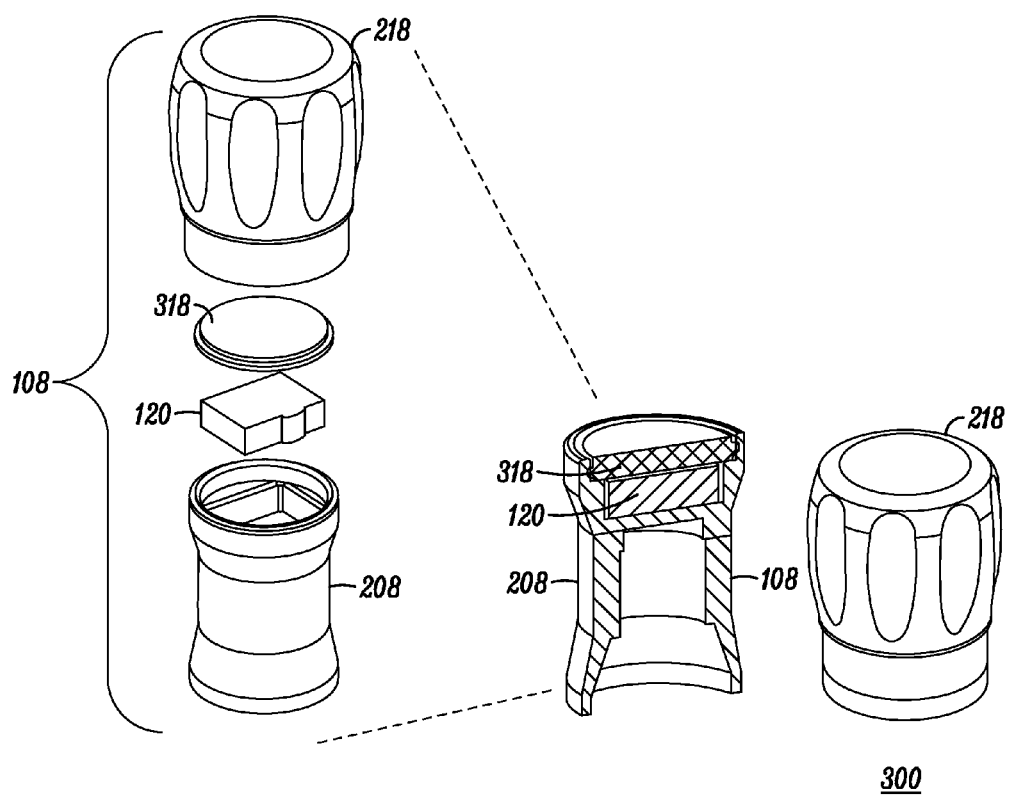
FIG. 3 shows a further embodiment of an RFID tag embedded into a control knob for a portable radio in accordance with the various embodiments.

FIG. 3 shows a further embodiment of the RFID tag 120 being embedded into a knob for a radio in accordance with embodiments disclosed herein. In this example base 208 is pre-molded as a first shot process. The RFID tag 120 is then inserted into the pre-molded base 208 and caped with an insulation plug 318, such as silicon rubber or other suitable protective material. The cover 218 is then formed with injection molding as a second shot process. The plug 318 insulates the RFID tag 120 during the second shot over-mold process. Samples of this two-shot process for encapsulating the RFID tag have been tested with successful results.

Figure 4:
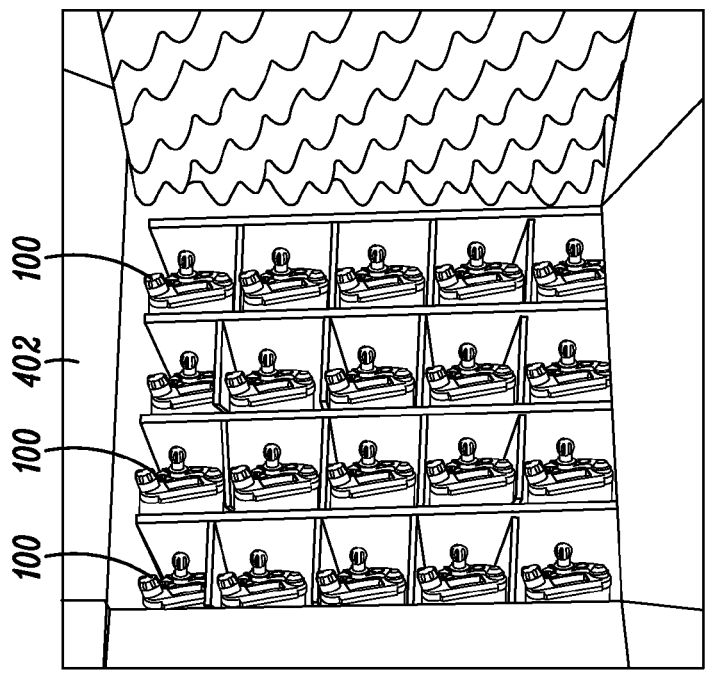
FIG. 4 shows an inventory tracking example for radios each having an RFID tag embedded into an external radio feature in accordance with the various embodiments.
Figure 4:
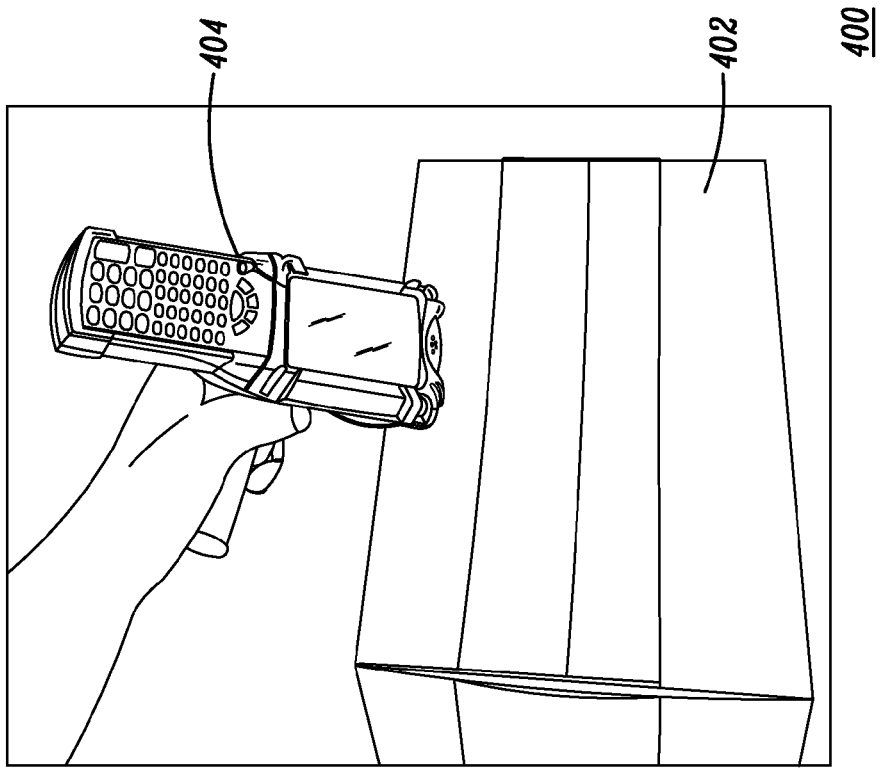

FIG. 4 shows an example of an inventory tracking system for plurality of radios each having an RFID tag embedded into an external radio feature in accordance with the various embodiments. Each radio 100 within the container 402 has an RFID tag, such as RFID tag 120, embedded into an external radio feature as previously described. An RFID reader 404 can read the tags, without having to open the container, to gather information pertaining to the radios. Both hand-held scanners and bench-mount scanners can be used. For best performance, the RFID tag 120 should not be blocked or shielded and preferably sits high within the container 402. Use of the embedded RFID tag into an external radio feature provides substantial benefits for asset management, inventory tracking, etc. as compared with say barcode technologies. Radio frequency identification provides a bulk data capture technology that, unlike barcodes, allows to quickly, accurately, and simultaneously read many tagged radios without requiring a direct line of sight between the RFID tag 120 and the reader 404.

Figure 5:
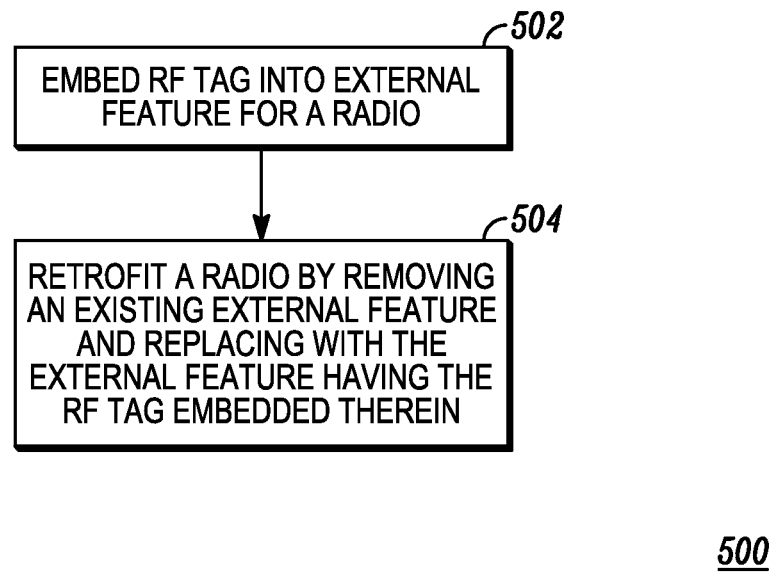
FIG. 5 is a method for retrofitting a radio in accordance with the various embodiments.

FIG. 5 is a method for retrofitting a portable radio in accordance with the various embodiments. Method 500 begins by embedding an RF tag into an external radio feature at 502. A radio can then be retrofitted at 504 by removing an existing external radio feature and replacing it with the external radio feature having the RFID tag embedded therein.

Accordingly, there has been provided an external radio feature having an embedded RFID tag to provide RFID capability to a radio. The external radio feature is removable and replaceable thus facilitating the retrofitting of radios with RFID tags. The RFID tag can be read under wide variety of circumstances, where barcodes or other optically read technologies would not be practical. The implementation can be done with either passive or active RFID tags. Active RFID tags have their own power source. Passive RFID tags do not require batteries, and can be much smaller and have a virtually unlimited life span. The ease of retrofitting radio devices in the field greatly facilitates upgrading the radios.

The use of the retrofit control or another replaceable external radio element having RFID avoids having to create special radio housings. The retrofit external radio feature with RFID provides a cost effective way to retrofit existing radios with RFID tags, while maintaining product's user interface, esthetics, usability, and reliability. The use of an embedded RFID tag allows for expeditious tracking of the portable radios without having to open containers and/or handle the actual radio which greatly improves operational costs and minimizes the likelihood of damage to the product.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Any published standards or other well-established industry practices referred to herein include only the teachings and information contained in and/or described by such publications as of the time of filing the present application.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio, comprising:
   a radio housing comprising an external control knob located on a surface of the radio housing, the external control knob being removable and replaceable by another retrofittable external control knob having an RFID tag embedded therein for retrofitting the radio device with RFID capability, wherein the retrofittable external control knob operates to provide a first radio control function and a second RFID tag function.

2. The radio of claim 1, wherein the first radio function is volume control.

3. The radio of claim 1, wherein the first radio function is channel control.

4. The radio of claim 1, wherein the RFID tag resides outside RF blocking elements of the radio.

5. The radio of claim 1, wherein the radio comprises at least one of:
   a handheld radio, a vehicular radio, a stationary radio.

6. The radio of claim 1, wherein the first radio control function comprises a user interface radio control function.

7. A method to retrofit a radio, comprising:
   embedding a radio frequency identification (RFID) tag within an external radio control knob; and
   retrofitting the radio by replacing an existing external radio control knob with the external radio control knob having the RFID tag embedded therein, wherein the external control knob provides a user interface radio function and an RFID tag function.

8. The method of claim 7, wherein the user interface radio function is volume control.

9. The method of claim 7, wherein the user interface radio function is channel control.

10. A radio tracking system, comprising:
    a container;
    a plurality of radios located within the container;
    a radio frequency identification (RFID) tag embedded into an external radio control knob of each radio of the plurality of radios, wherein the external radio control knob provides a first radio function and second RFID tag function; and
    a scanner for simultaneously reading the RFID tags without requiring a direct line of sight between the RFID tag and the scanner.

11. The radio tracking system of claim 10, wherein the plurality of radios comprise one or more of:
    handheld radios, mobile radios.

12. The radio tracking system of claim 10, wherein the first radio function of the external radio control knob is a user interface function.

13. The radio tracking system of claim 12, wherein the first radio function of the external radio control knob is volume control.

14. The radio tracking system of claim 12, wherein the first radio function of the external radio control knob is channel control.

15. The radio tracking system of claim 10, wherein the external control knob of each of the plurality of radios is removable and replaceable.

* * * * *